(12) United States Patent
Krohmer (10) Patent No.: US 11,739,846 B2
(45) Date of Patent: Aug. 29, 2023

(54) SEPARATE VALVE SEATING

(71) Applicant: Schwäbische Hüttenwerke Automotive GmbH, Aalen-Wasseralfingen (DE)

(72) Inventor: Alexander Krohmer, Berg-Weiler (DE)

(73) Assignee: Schwäbische Hüttenwerke Automotive GmbH, Aalen (DE)

( * ) Notice: Subject to any disclaimer, the term of this patent is extended or adjusted under 35 U.S.C. 154(b) by 0 days.

(21) Appl. No.: 17/329,848

(22) Filed: May 25, 2021

(65) Prior Publication Data

US 2021/0372529 A1 Dec. 2, 2021

(30) Foreign Application Priority Data

May 26, 2020 (DE) ...................... 10 2020 114 107.6

(51) Int. Cl.
*F16K 1/14* (2006.01)
*F16K 1/12* (2006.01)
(Continued)

(52) U.S. Cl.
CPC .............. *F16K 1/14* (2013.01); *B60T 8/4031* (2013.01); *F04B 53/1002* (2013.01);
(Continued)

(58) Field of Classification Search
CPC . F16K 1/14; F16K 1/12; F16K 15/063; F16K 15/066; F16K 15/044; F16K 27/02;
(Continued)

(56) References Cited

U.S. PATENT DOCUMENTS 3,185,175 A * 5/1965 Plate ...................... F15B 13/04
 91/33
3,279,558 A * 10/1966 Allen ...................... B62D 5/07
 137/115.06

(Continued)

FOREIGN PATENT DOCUMENTS

CN 1191958 A 9/1998
DE 102009054501 A1 6/2011
(Continued)

OTHER PUBLICATIONS

German Search Report issued in German Patent Application 10 2020 114 107.6 dated Feb. 11, 2021, 6 pages.
(Continued)

*Primary Examiner* — Patrick C Williams
(74) *Attorney, Agent, or Firm* — RatnerPrestia (57) ABSTRACT

A device including a valve array which is adapted to allow and block a fluid flow, wherein the valve array includes: a fluid channel; a valve seating; and a closing body, for example a rotationally symmetrical or spherical closing body, which is arranged in the fluid channel. The valve array is configured to allow a fluid flow when the closing body is lifted off the valve seating, and to prevent a fluid flow when the closing body rests against the valve seating. The valve seating is formed by a valve seating body, for example an annular valve seating body, which is arranged in or on the fluid channel.

14 Claims, 1 Drawing Sheet

(51) Int. Cl.
*F16K 27/02* (2006.01)
*B60T 8/40* (2006.01)
*F04B 53/10* (2006.01)
*F04B 53/16* (2006.01)
*F16K 15/06* (2006.01)
*F16K 15/04* (2006.01)

(52) U.S. Cl.
CPC ...... *F04B 53/1022* (2013.01); *F04B 53/1087* (2013.01); *F04B 53/16* (2013.01); *F16K 1/12* (2013.01); *F16K 15/063* (2013.01); *F16K 15/066* (2013.01); *F16K 27/02* (2013.01); *F16K 27/0209* (2013.01); *F16K 15/044* (2013.01)

(58) Field of Classification Search
CPC ............... F16K 27/0209; B60T 8/4031; F04B 53/1002; F04B 53/1022; F04B 53/1087; F04B 53/16
See application file for complete search history.

(56) References Cited

U.S. PATENT DOCUMENTS

| | | | |
|---|---|---|---|
| 3,373,695 A | | 3/1968 | Yohpe |
| 3,427,988 A | * | 2/1969 | Redman .................. F04B 53/10 417/569 |
| 3,801,234 A | | 4/1974 | Love et al. |
| 3,834,666 A | * | 9/1974 | Keith ........................ F16K 1/34 251/361 |
| 3,870,071 A | * | 3/1975 | Graham .................. F16K 15/03 137/527 |
| 3,870,439 A | | 3/1975 | Stachowiak et al. |
| 4,277,229 A | | 7/1981 | Pacht |
| 4,467,703 A | * | 8/1984 | Redwine ............... F04B 53/162 417/539 |
| 5,171,136 A | | 12/1992 | Pacht |
| 5,362,215 A | * | 11/1994 | King ...................... F04B 49/10 137/542 |
| 5,807,081 A | | 9/1998 | Schutte et al. |
| 6,332,761 B1 | | 12/2001 | Guentert et al. |
| 7,335,002 B2 | * | 2/2008 | Vicars .................. F04B 53/007 137/512 |
| 8,733,733 B2 | * | 5/2014 | Collison ............... F16K 5/0678 251/174 |
| 2011/0206547 A1 | * | 8/2011 | Kim ........................ F04B 15/02 417/568 |
| 2016/0186697 A1 | | 6/2016 | Tsuzuki |
| 2018/0363642 A1 | * | 12/2018 | Salih .................. F04B 53/1025 |

FOREIGN PATENT DOCUMENTS

| | | |
|---|---|---|
| DE | 102015016299 A1 | 6/2016 |
| EP | 0532603 B1 | 3/1993 |
| FR | 3050780 A1 | 11/2017 |

OTHER PUBLICATIONS

Extended European Search Report issued In European Application No. 21174340.6, dated Oct. 14, 2021 with machine translation, 20 pages.

English Translation of the Chinese Office Action for Chinese Application No. 202110575917.4, dated Dec. 5, 2022, 11 pages.

* cited by examiner

SEPARATE VALVE SEATING

CROSS REFERENCE TO RELATED APPLICATION

This application claims priority to German Patent Application No. 10 2020 114 107.6, filed May 26, 2020. The contents of this application are incorporated herein by reference.

FIELD OF INVENTION

The invention relates to a device comprising a valve array which is adapted to allow and/or block a fluid flow. The valve array can in particular be adapted to allow a fluid flow in a first direction, in particular a flow direction, and to block it in a second direction which is opposite to the first direction, in particular the flow direction. The valve array can be formed as a reflux valve or can at least act as a reflux valve. The valve array can be adapted for use or installation in a delivery pump. The invention therefore also relates to a device comprising a pump or delivery pump which comprises such a valve array. The pump can for example be an oil pump or fuel pump. The pump can for example supply a hydraulic motor or a transmission, such as for example a vehicle transmission or a transmission of a motor vehicle, with fluid, in particular in order to lubricate and/or cool and/or actuate components of the transmission. It can for example form a transmission unit with the transmission or can be fastened to a transmission or at least connected to the transmission in terms of flow dynamics and in particular connected in fluid communication with the transmission. The pump can in principle be used to supply an internal combustion engine, in particular an internal combustion engine of a motor vehicle, with fluid, in particular in order to lubricate and/or cool it. The pump can be part of a pump-motor unit. The pump-motor unit can for example comprise an electric motor for driving the pump. Alternatively, it can also be possible to drive the pump using a motor other than an electric motor, such as for example an internal combustion engine, in particular an internal combustion engine of a vehicle or motor vehicle. The pump can be mechanically coupled to the internal combustion engine for this purpose, for example via a chain or a belt via which a rotation of a crankshaft can be transmitted onto the pump. If a pump-motor unit comprises an electric motor, the pump and the electric motor can together form a unit which can be handled as a unit and/or fastened to other components, such as for example the transmission mentioned.

Another pump, in particular an auxiliary pump, can for example be arranged on or fastened to the pump, such that the device can comprise the pump and the auxiliary pump. This unit consisting of two pumps can for example form a transmission unit with the transmission or can be fastened to the transmission or at least connected to the transmission in terms of flow dynamics and in particular connected in fluid communication with the transmission. The device can therefore comprise the transmission and the pump or pumps.

SUMMARY OF INVENTION

An aspect of the present invention is based on providing a device comprising a valve array which is simple to manufacture and assemble.

An aspect of the invention is based on a valve array, in particular a device comprising such a valve array. The valve array can for example be a reflux valve, a bypass valve or a pressure relief valve. It is adapted to allow a fluid flow through the valve array or through a fluid channel in a valve state in which a closing body is in particular lifted off a valve seating, and to not allow a fluid flow, i.e. to block the fluid flow, in another valve state in which the closing body in particular rests against the valve seating. The valve array can for example be adapted to allow a fluid flow through the valve array or through the fluid channel in a first direction, in particular a flow direction, and to block it in a second direction which is opposite to the first direction, in particular the flow direction. The first direction can for example point from a pump chamber or delivery chamber (pressure side) of a delivery pump to a consumer or a suction side (pump inlet or fluid reservoir) of the delivery pump. The second direction can for example point from a consumer or another pump, for example in a system which comprises a main pump and an additional pump or auxiliary pump, or from a suction side (pump inlet or fluid reservoir) of a pump to the pump chamber.

Fluid can for example be discharged or can flow off from the pump chamber in the first direction via the fluid channel while the pump is in operation. The valve array allows a fluid flow in the first direction and does not allow a fluid flow in the second direction, in order to prevent fluid from flowing back into the pump chamber. The pump can be switched off by the valve array, wherein the fluid pressure, which can sometimes assume relatively high values, is maintained in the fluid system arranged after the valve array in the first direction. The valve array can avoid a pressure burden, limit a delivery rate and/or delivery pressure or prevent the fluid from flowing (back) to the pressure side of the pump.

The valve array comprises a fluid channel, a valve seating and a closing body, for example a rotationally symmetrical or spherical closing body, which is arranged in the fluid channel. The closing body can for example be lifted off the valve seating and/or moved against the valve seating by a translational movement along the fluid flow direction provided by the valve array. The valve array is configured to prevent a fluid flow, in particular in the second direction and in the first direction, when the closing body rests against the valve seating and to allow a fluid flow, in particular in the first direction, when the closing body is lifted off the valve seating. During operations, the closing body can rest against the valve seating and block a flow in the second direction and in the first direction when a force acting on the closing body in the second direction, which in particular results from the pressure on the side of the closing body pointing in the first direction and/or from a spring force acting on the closing body, is greater than a force acting on the closing body in the first direction, which in particular results from the pressure on the side of the closing body pointing in the second direction and/or from a spring force acting on the closing body. The closing body can lift off the valve seating, in particular by a translational movement along the fluid flow direction, and allow a flow in the first direction when the force acting on the closing body in the first direction, in particular due to the fluid pressure on the second side of the closing body, in particular the pressure on the side of the closing body pointing in the second direction, is greater than the force acting on the closing body in the second direction, in particular due to the fluid pressure on the first side of the closing body force, in particular the pressure on the side of the closing body pointing in the first direction, plus the spring force acting in addition to the pressure on the side of the closing body pointing in the first direction, if such a spring is provided.

The valve array can be configured such that, when the closing body is sprung, i.e. tensioned against the valve seating by a spring force, the closing body lifts off its valve seating only once the pressure difference between the fluid pressures on the first and second side of the closing body is large enough that the spring is compressed, i.e. the valve array can for example be configured such that the closing body lifts off its valve seating only once the resultant force acting on the closing body due to the fluid pressures on the first side and the second side of the closing body exceeds the biasing force with which the spring presses the closing body against the valve seating.

The valve seating is formed by a body, i.e. a valve seating body, which is in particular a separate body arranged in or on the fluid channel. The body can for example be annular. The outer circumference, in particular the outer circumferential surface, of the body forming the valve seating can for example be held by an inner circumference, in particular an inner circumferential surface, of the fluid channel, for example a valve seating body receptacle. The body can comprise a passage which extends from its first end to its second end and through which fluid can flow through the body.

The fluid channel can be formed by a housing of the device, in particular the pump housing of a first pump or main pump. In particular, the inner circumference of the fluid channel can be formed by the housing of this pump. The valve seating body is formed separately from the housing. It is however in principle also conceivable for the valve seating body to be formed integrally with the housing or by the housing.

In accordance with a first aspect, the body forming the valve seating body can protrude out of the housing and/or the fluid channel, in particular of the first pump, and in particular protrude partially out of the housing and/or the fluid channel. A portion of the body can be arranged in the housing and/or the fluid channel, while another portion extends beyond the housing and/or out of the fluid channel or protrudes out of the housing and/or the fluid channel. This enables the valve seating to advantageously be used to center a component part, which is to be arranged on or fastened to the housing, on or by means of the body forming the valve seating. The device can therefore comprise a component part which is arranged on, in particular fastened to, the housing of the pump, in particular the first pump or the main pump. A portion of the body, in particular the portion protruding beyond the housing and/or out of the fluid channel, can protrude into the component part. The component part can optionally be centered on or by means of the body, in particular the portion of the body protruding beyond the housing and/or out of the fluid channel. The component part can for example be a cover of the pump or an intermediate plate or intermediate housing of the pump or a second pump, in particular an auxiliary or additional pump, or a second housing, in particular a housing of a second pump, auxiliary pump or additional pump.

The component part can in particular comprise an inner circumference, in particular an inner circumferential surface, which surrounds an outer circumference, in particular an outer circumferential surface, of the body and is in particular centered on it. The inner circumference of the component part can thus rest against the outer circumference of the body. The inner circumference and the outer circumference can optionally exhibit diameters which are in particular roughly equal or are matched to each other such that they form a fit system of fit, in particular a clearance fit, transition fit or press fit.

Using the body forming the valve seating to center the component part to be attached to the housing advantageously saves on a centering element which is separate from the body forming the valve seating, for example a centering pin or centering sleeve, for correctly positioning the component part on the housing.

In developments, the outer circumference of the body can be cylindrical, in particular circular-cylindrical. The portion of the component part arranged or held in the fluid channel, and the portion of the body provided for centering the component part, can for example be cylindrical, in particular circular-cylindrical. The two portions can exhibit the same or different outer diameters.

In accordance with another aspect of the invention, the body can alternatively or additionally be held on the inner circumference of the fluid channel in a frictional fit and/or a positive fit and/or a material fit. It is advantageous if the body is held in the fluid channel by a surmountable holding force resulting from a frictional fit and/or positive fit and/or material fit. The frictional-fit and/or positive-fit and/or material-fit connection between the body and the inner circumference of the fluid channel can be formed such that the body is held on the inner circumference of the fluid channel in a surmountable frictional fit or in a surmountable positive fit or in a surmountable material fit, wherein "surmountable" means in particular that the holding force of the frictional-fit, positive-fit or material-fit connection can be overcome by a force which is caused by the fluid pressure in the fluid channel and/or by the spring, if the closing body is sprung, and which acts on the valve seating body, in particular directly or indirectly (for example via the closing body), when the pump—in particular, the main pump or auxiliary pump or additional pump—is in operation, in order to release the positive-fit or frictional-fit or material-fit connection and shift the valve seating body.

The valve seating body can for example be held firmly enough on the inner circumference in a frictional fit or positive fit or material fit that it cannot be shifted relative to the inner circumference at least by the forces acting on it during operations. It is however preferred if the valve seating body is held firmly enough on the inner circumference of the fluid channel and/or valve seating body receptacle in a surmountable frictional fit or in a surmountable positive fit or in a surmountable material fit that it can be shifted or can be able to be shifted relative to the inner circumference in the second direction in particular by the force acting on the valve seating body during operations, i.e. the valve seating body can be shifted in the second direction, in particular translationally, in a position in which it is held on the inner circumference, in particular in a frictional fit and/or in a positive fit and/or in a material fit. It is generally preferred if the valve seating body can be moved, in particular translationally shifted, relative to the fluid channel.

Alternatively or additionally, the valve seating body can be able to be shifted from a first holding position, in which it is held on the inner circumference of the fluid channel and/or valve seating body receptacle in a surmountable frictional fit and/or in a surmountable positive fit and/or in a surmountable material fit, in the second direction or out of the valve seating body receptacle to a second holding position in which a movement of the valve seating body in the second direction or out of the valve seating body receptacle is blocked. When the valve seating body is in its first holding position, a movement of the valve seating body in the first direction or into the valve seating body receptacle can for example be prevented by the frictional-fit connection or surmountable positive-fit connection between the valve seating body and the inner circumference and/or by an insurmountable positive-fit connection between the valve seating body and the fluid channel, in particular by the fluid channel comprising an abutting surface or axial abutting surface against which the closing body holder rests or can rest in its first holding position. In the second holding position, the valve seating body can for example be blocked from moving in the second direction by a positive fit, in particular an insurmountable positive fit. In the second holding position, the valve seating body can in particular be held on the inner circumference of the fluid channel in a frictional fit and/or held on the inner circumference of the fluid channel or on a component part which is separate from the inner circumference of the fluid channel, for example a component part on which the body is supported in the second direction, in a positive fit. In the second holding position, the valve seating body or an abutment of the valve seating body can for example rest, in particular axially, against a separate component part or a (translational) abutment of the component part which is separate from the component part, in particular the pump housing, that forms the fluid channel and/or the valve seating body receptacle. When the valve seat body is shifted from the first holding position to the second holding position, the component part—in particular, the (translational) abutment of the component part—stops the movement of the valve seating body in the second holding position.

The separate component part, in particular a cover of the pump or an intermediate plate or intermediate housing of the pump or a second pump or a second housing, for example a housing of the second pump, can be fastened to the pump housing, which in embodiments can form the fluid channel, or to the first pump. The valve seating body can in particular be prevented from shifting further in the second direction by the fact that the valve seating body rests against the separate component part in the second holding position, even when the valve seating body and the valve seating body receptacle expand to different extents, for example due to changing operating temperatures of the delivery pump or the fluid to be delivered, for example when they are made of different materials or exhibit different coefficients of thermal expansion.

Alternatively or additionally, the separate component part can be a component part which is fastened to the pump housing and which is separate from the pump housing and the valve seating body. Optionally, the component part can be arranged in the fluid channel and/or fastened to the fluid channel, for example to an inner circumferential wall of the fluid channel.

A surmountable positive-fit connection can for example be formed by the inner circumferential wall comprising a recess and the valve seating body comprising a projection which engages the recess, or by the inner circumferential wall comprising a projection and the valve seating body comprising a recess which the projection engages, wherein the projection is pressed out of the recess through by exerting an axial force, caused in particular by the fluid pressure or the fluid flow, on the valve seating body, for example by elastically or plastically deforming the projection or elastically or resiliently arranging the projection.

A surmountable material-fit connection can for example be formed an additive, such as for example an adhesive, grease or solder, being situated between the valve seating body and the inner wall. The connection can therefore be an adhesive or soldered connection which is configured such that it is released by the axial force acting on the closing body or valve seating body during operations. This can shift the valve seating body from the first holding position to the second holding position.

In the second holding position, the valve seating body can be held on the inner circumference of the fluid channel in a frictional fit and/or held on the inner circumference of the fluid channel or on the component part which is separate from the inner circumference of the fluid channel, for example the component part on which the valve seating body is supported in the second direction, in a positive fit.

In embodiments, a portion of the valve seating body can protrude out of the fluid channel or the pump housing when the valve seating body is arranged in the valve seating body receptacle, in particular when the valve seating body is in its first holding position and/or second holding position. In the second holding position, and optionally also in the first holding position, the valve seating body can for example protrude partially into the component part which is arranged on or fastened to the housing.

In the second holding position, the valve seating body can additionally be held, for example on the inner circumference of the fluid channel or the inner circumference of the valve seating body receptacle, in a frictional fit or in a positive fit, in order to prevent a movement, in particular a translational movement, of the valve seating body in the second direction relative to the inner circumference.

In embodiments, the valve seating body can be made of plastic and can in particular be an injection-molded part. This enables the valve seating body to be manufactured in a simple and cost-effective way and to meet the structural and functional demands made of it.

The advantage of an arrangement in which the valve seating body can be shifted, in particular translationally, is that the press-fitting force of the valve seating body need only be designed for transporting the device, in particular the delivery pump, i.e. the holding force need only be sufficient for transport. It may thus be possible to insert the valve seating body into the fluid channel by hand, without the use of expedients. Preferably, no particular measures need then be taken when assembling the valve seating body in order to establish or assure a positionally secure connection for any conceivable operating state (pressure conditions, temperatures, material expansions, vibrations, jolts, etc.). Preferably, a positionally secure connection is established at the latest when the valve seating body is in its second holding position. A positionally secure connection is advantageously assured or ensured by the second holding position.

For the purpose of assembly, the closing body is placed into the fluid channel, and the valve seating body is then inserted into the fluid channel, in particular into the valve seating body receptacle in order to form a frictional fit, in particular a surmountable frictional fit, or a positive fit, in particular a surmountable positive fit, or a material fit, in particular a surmountable material fit, with the inner circumference. The valve seating body and the closing body are prevented from falling out by the surmountable frictional fit or the surmountable positive fit or the surmountable material fit between the inner circumference and the valve seating body. The device, in particular the delivery pump, can thus be easily transported, even when the separate component part is not yet attached or fastened to the housing of the delivery pump. Conversely, the valve seating body can be easily manufactured, since only small demands are made on its dimensional accuracy with regard to fastening it in the fluid channel. The valve seating body can also be easily assembled on the fluid channel, since it need not snap into place or irreversibly snap into place. This makes the fluid channel easier to produce, since it need not comprise any undercuts for latching, let alone irreversibly latching.

The component part which is attached, in particular fastened, to the housing or pump housing can for example form an abutment, in particular an axial or translational abutment, for the valve seating body. The valve seating body can rest against the separate component part, in particular axially or via an end-facing surface, or can assume a position in which the body rests against the component part.

A gap can for example be formed between the valve seating body and the component part when the valve seating body is in its first holding position. The valve seating body can be shifted or able to be shifted by the width of the gap from the first holding position to the second holding position and then abut against the component part.

As already mentioned, the separate component part can be a cover of the pump or an intermediate plate or intermediate housing of the pump or a second pump or a second housing, for example a housing of a second pump. Alternatively or additionally, the fluid channel can be formed by a pump housing of the first pump or main pump.

A second pump, in particular an additional pump or auxiliary pump, which can accordingly be arranged on the pump housing, in particular on the first pump or main pump, comprises a fluid channel which is connected in fluid communication with the fluid channel of the first pump in such a way that fluid can be delivered from the second pump through the valve array and the fluid channel of the pump housing of the first pump. The valve array thus enables fluid to be delivered from the second pump through the fluid channel of the first pump, in particular towards an outlet, wherein the valve array can prevent fluid from flowing into the second pump.

In developments, the first pump can be adapted to deliver fluid to an outlet via a delivery chamber and an outlet channel which connects the delivery chamber and the outlet. The fluid channel and the outlet channel can merge, such that fluid can be delivered from the delivery chamber to the outlet via the outlet channel and/or via the fluid channel of the valve array. Fluid can for example be delivered to the outlet using the second pump when the first pump does not deliver any fluid or not enough fluid to the outlet. When the first pump does deliver enough fluid to the outlet, the second pump can be put out of operation or its delivery rate can be reduced.

In developments, a valve—in particular, a reflux valve—which can be arranged between the delivery chamber of the first pump and the outlet of the first pump is adapted to allow a fluid flow from the delivery chamber of the first pump to the outlet of the first pump and to block it in the opposite direction. The fluid channel and the outlet channel ideally merge between the valve arranged in the outlet channel and the outlet of the first pump.

The outlet of the first pump is adapted to be connected in fluid communication with a fluid consumer, in particular one of the fluid consumers mentioned here, such as for example the internal combustion engine or a transmission. Alternatively, the outlet can be connected to the fluid consumer. The first pump, including in particular a combination of the first pump and the second pump or a unit consisting of the first pump and the second pump, can be arranged on a housing of the fluid consumer, in particular fastened or able to be fastened to a housing of the fluid consumer. A sealing element, such as for example a sealing ring, which can for example be arranged between the housing of the fluid consumer and the housing of the first pump, surrounds the outlet circumferentially and seals off the fluid connection, between the outlet of the first pump and the inlet of the fluid consumer, with respect to the outside.

A sealing element, such as for example a sealing ring, which can for example be arranged between the component part in which the valve array is arranged and the component part which is arranged thereon and into which the valve seating body protrudes or against which the valve seating body abuts or axially rests or on which the component part is centered, surrounds the valve seating body circumferentially and seals off the fluid connection, between the two component parts, in particular the first pump and/or its housing and the second pump and/or its housing, with respect to the outside.

In developments of the valve array, the latter can comprise a spring element, preferably a biased spring element, in particular a mechanical spring, in particular a helical or spiral spring, which acts on the closing body and is in particular supported on the closing body and presses it against the valve seating.

One end of the spring element, in particular the end which is opposite the end which is supported on the closing body, can for example be supported on the housing. Alternatively, one end of the spring element, in particular the end which is opposite the end which is supported on the closing body, can be supported on an end-facing wall of a closing body holder. The closing body holder can be inserted into the fluid channel as a separate part.

The closing body holder can for example be fastened to the valve seating body and/or the valve seating body and the closing body holder can be able to be shifted as a unit. Alternatively, it is possible for the closing body holder to not be fastened to the valve seating body and/or for the valve seating body to be able to be shifted relative to the closing body holder.

The end-facing wall of the closing body holder, on which the spring element is supported, can form the end of the closing body holder which faces away from the valve seating body.

The valve array can for example comprise a closing body holder which encloses the closing body laterally and/or on an end-facing side, and comprise at least one opening which is formed such that the fluid flowing through the fluid channel can flow through it. The lateral enclosure of the closing body can for example form at least one opening and preferably multiple openings. Alternatively or additionally, the end-facing side—in particular, the end-facing wall—on which the spring element is supported can comprise at least one opening. The closing body can for example be enclosed axially between the end-facing wall and the valve seating body, wherein it can be able to be moved back and forth against the force of the optionally provided spring. In a valve array with no spring, the closing body can be freely or substantially freely moved back and forth between the valve seating and the end-facing wall.

The closing body holder can enclose the closing body laterally and in particular guide it such that it can be moved substantially translationally between the valve seating and the end-facing wall.

In preferred embodiments, the fluid channel—in particular, the inner wall of the fluid channel—can comprise at least one cavity in the region of the closing body holder, into which the at least one lateral opening of the closing body holder emerges. One cavity can for example be provided for the opening, or one cavity can be provided for a plurality of openings, or one opening can be provided for a plurality of cavities. The at least one cavity can extend past the end-facing wall of the closing body holder, which forms the end of the closing body holder which points in the first direction and/or on which the spring element is supported, and emerge into a portion of the fluid channel which lies on the side of the end-facing wall which points in the first direction. The fluid delivered for example by the second pump can thus flow through the closing body holder, in particular its lateral opening, into the cavity of the fluid channel and from there past the closing body holder into the portion of the fluid channel which lies on the side of the end and/or end-facing wall of the closing body holder which points in the first direction.

The closing body can be formed to be rotationally symmetrical, such as for example in the shape of a cone or truncated cone, or can form at least a portion which is provided for resting against the valve seating and in which the outer surface forms a part of a surface area. In an advantageous embodiment, the closing body is a sphere or forms at least a portion which is provided for resting against the valve seating and in which the outer surface forms a part of a spherical surface.

BRIEF DESCRIPTION OF THE DRAWINGS

The invention has been described on the basis of several preferred embodiments and examples. An embodiment of the invention is described below on the basis of a FIGURE. The features thus disclosed, each individually and in any combination of features, advantageously develop the subject-matter of the claims.

DETAILED DESCRIPTION OF THE INVENTION

Figure 1:
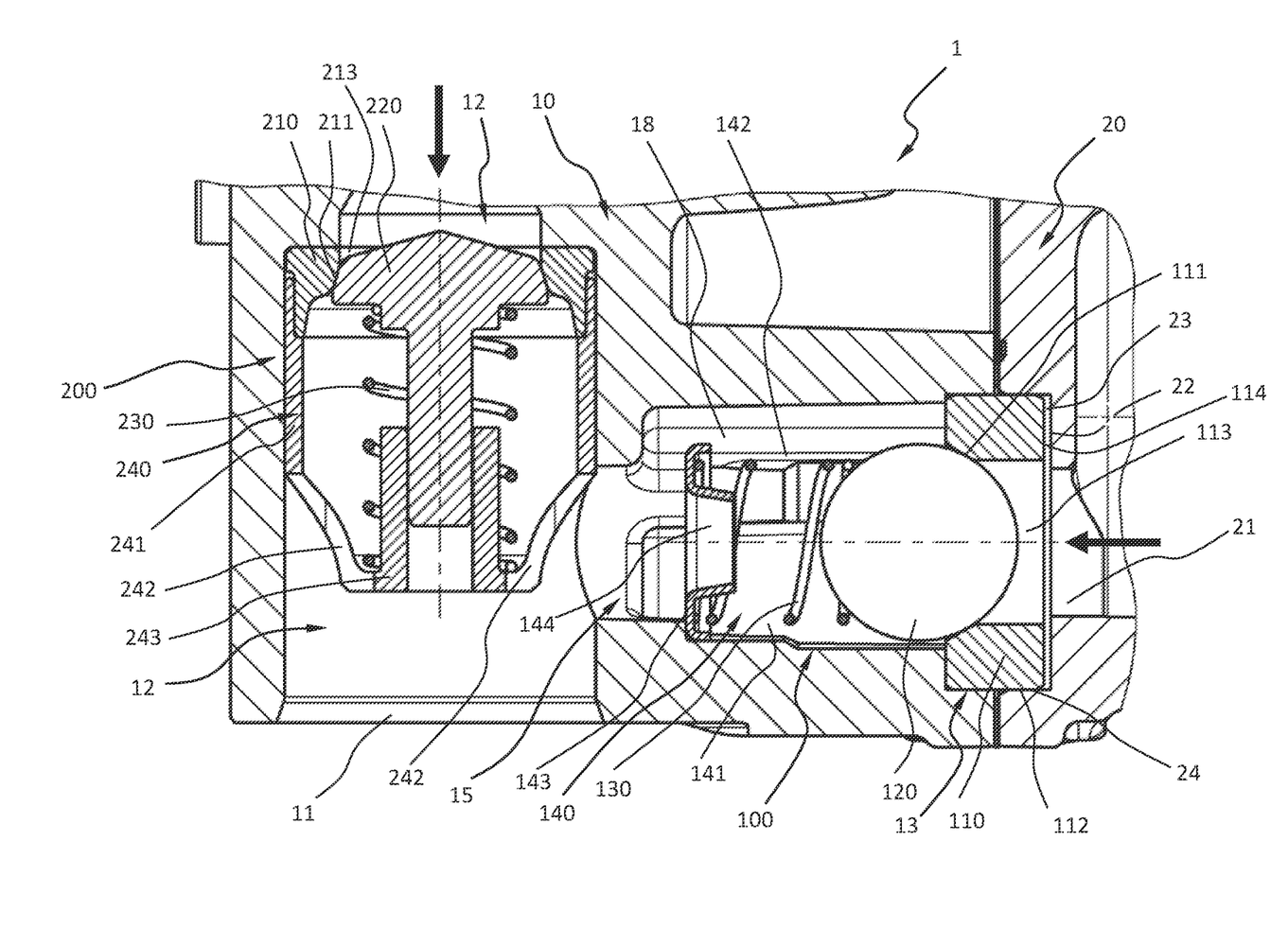
The FIGURE shows a section through a housing 10 of a first pump and a housing 20 of a second pump arranged thereon.

The housing 10 forms an outlet channel 12 and a fluid channel 15. The outlet channel 12 extends from a delivery chamber (not shown) of the first pump up to an outlet 11 at which the outlet channel 12 emerges onto the outer side of the housing 10. A delivery element which is arranged in the delivery chamber of the first pump is rotated relative to the housing 10 during delivery operations and thus delivers fluid, in particular oil, to the outlet 11 via the outlet channel 12.

The fluid channel 15 merges with the outlet channel 12 and/or emerges into the outlet channel 12—between a valve 200, arranged in the outlet channel 12, and the outlet 11 in the example shown. The fluid flows are thus delivered to the outlet 11 through the outlet channel 12 and the fluid channel 15.

A second pump is arranged on the first pump. The first pump can for example serve as the main pump, wherein the second pump can serve as an auxiliary or additional pump. The second pump comprises a housing 20 which is arranged on the housing 10 of the first pump, for example fastened to the housing 10 of the first pump. The second pump, in particular the housing 20, comprises a fluid channel 21 which emerges into the fluid channel 15 of the housing 10. This means that fluid delivered by the second pump is delivered to the outlet 11 through the fluid channel 21 and the fluid channel 15. The second pump can comprise a delivery chamber (not shown) in which a rotatable delivery element is arranged. The delivery element rotates during operations and delivers fluid, in particular oil, into the fluid channel 15 via the fluid channel 21.

The first pump and/or the first housing 10 comprises a valve array 100 which is adapted to allow a fluid flow in a first direction (see the direction of the arrow) and to block it in a second direction which is opposite to the first direction. The valve array 100 therefore allows a fluid flow from the second pump towards the outlet 11 and does not allow a fluid flow from the outlet 11 towards the second pump.

In addition to the fluid channel 15, the valve array 100 comprises a valve seating 111, which is formed by an annular valve seating body 110, and a closing body 120 which is arranged in the fluid channel 15 and is spherical in this example. In the example shown, the valve array 100 also comprises a spring element 130 which is embodied as a helical and/or spiral spring and which acts as a compression spring. One end of the spring element 130, which is preferably a biased spring element, is supported on the closing body 120, and the other end is supported on an end-facing wall 143 of a closing body holder 140. In embodiments with no closing body holder 140, the end of the spring can for example be supported directly on a structure of the fluid channel 15 support or on the housing 10.

The biased spring 130 presses the closing body 120 against the valve seating 111. The closing body 120 forms a sealing gap with the valve seating 111. The valve seating 111 is a surface which is formed to be complementary to the outer surface of the closing body 120. The valve seating body 110 forms a passage 113 through which the fluid to be delivered can flow.

The closing body holder 140 circumferentially encloses an accommodating space in which the closing body 120 and the spring element 130 are arranged. The closing body holder 140 comprises an end-facing wall 143 which forms the end of the closing body holder 140 pointing in the first direction and serves as a support for the spring element 130. The closing body 120 is guided by a lateral enclosure 141 which encloses or surrounds the accommodating space, such that the closing body 120 can substantially only be moved translationally between the end-facing wall 143 and the valve seating body 110. The lateral enclosure 141 of the closing body holder 140 comprises at least one opening 142 which emerges into a cavity 18 of the fluid channel 15 in order to enable the fluid to be delivered to escape from the closing body holder 140, in particular radially, via the at least one opening 142, and be delivered via the at least one cavity 18 past the end of the closing body holder 140 pointing in the first flow direction and into a portion of the fluid channel 15 which lies on the side of the closing body holder 140 pointing in the first direction. The fluid channel 15 can accordingly comprise, in the region of the closing body holder 140, the at least one cavity 18 into which the at least one lateral opening 142 emerges and which extends past the end-facing wall 143 of the closing body holder 140 and re-emerges into a portion of the fluid channel 15 which lies on the side of the end-facing wall 143 pointing in the first direction.

Alternatively or additionally, the end-facing wall 143 can comprise an opening 144 through which fluid can be delivered from the accommodating space into the portion of the fluid channel which lies on the side of the end-facing wall 143 pointing in the first direction. The opening 144 can for example be surrounded by the spring element 130. The spring element 130 can in particular be supported in a region of the end-facing wall 143 which lies between the opening 144 and the lateral enclosure 142.

The closing body holder 140 can be fastened to the valve seating body 110 such that it is at least fixed against shifting axially. Alternatively, the closing body holder 140 and the valve seating body 110 can be able to be shifted, for example translationally, relative to each other.

The valve seating body 110 is held by an inner circumference of the fluid channel 15, in particular an inner circumference of a valve seating body receptacle 13. The outer circumference 112 of the valve seating body 110 is held by the inner circumference of the fluid channel 15 and/or valve seating body receptacle 13—in this example, in a surmountable frictional fit. Alternatively or additionally, the valve seating body 110 can be held in a surmountable positive fit and/or in a surmountable material fit. In the position shown in the FIGURE, the valve seating body 110 is arranged in a first holding position. A gap 23 exhibiting a gap width is formed between the end-facing surface 114 of the valve seating body 110 pointing in the second direction and an axial abutment 22, in particular an axial abutting surface, of the housing 20. The valve seating body 110 can assume the first holding position when the valve array 100 is assembled.

The valve seating body 110 can be shifted in the second direction, i.e. counter to the direction of the arrow, from the first holding position, in which it is held on the inner wall of the valve seating body receptacle 13 in a surmountable frictional fit and/or in a surmountable positive fit and/or in a surmountable material fit, into a second holding position in which a movement of the valve seating body 110 in the second direction is blocked. The valve seating body 110 can in particular be shifted in the second direction by the gap width of the gap 23. In the second holding position, the end-facing surface 114 abuts or rests against the axial abutment 22 of the housing 20. The valve seating body is thus held in the second holding position in a positive fit by the housing 20 which is separate from the inner wall of the fluid channel 15 and/or housing 10. It is then no longer possible for the valve seating body 110 to shift further in the second direction.

The valve seating body 110 which is separate from the housing 10 can therefore be formed such that it only needs to be arranged in the valve seating body receptacle 13 with a force that prevents the valve seating body 110 from falling out, for example when the housing 20 is not yet arranged on the housing 10. When the housing 20 is arranged on or fastened to the housing 10, forces can act on the valve seating body 110, for example during operations, which can shift it from the first holding position to the second holding position. It is therefore only necessary during assembly to ensure that the valve seating body 110 remains on the housing 10 in the valve seating body receptacle 13 during transport and until final assembly, in which the housing 20 is arranged on the housing 10. During assembly, i.e. when introducing the valve seating body 110 into the valve seating body receptacle 13, it is therefore not necessary to ensure a positionally secure arrangement of the valve seating body 110 for all operating states. As an alternative to arranging the valve seating body 110 in the valve seating body receptacle 13 in such a surmountable positive fit and/or surmountable frictional fit and/or surmountable material fit, the valve seating body 110 can be press-fitted, glued, soldered or fixedly arranged in a positive fit and/or frictional fit in the valve seating body receptacle 13.

The positionally secure arrangement of the valve seating body 110 for all operating states is only achieved in the final assembly state, i.e. when the housing 20 is fastened to the housing 10. A particularly reliable arrangement of the valve seating body 110 can be realized by the axial abutment 22 for the valve seating body 110, since even a press-fitted valve seating body 110 which is supposedly positionally secure for all operating states can shift, in particular due to different coefficients of thermal expansion of the valve seating body and the housing 10.

As also shown in the FIGURE, a portion of the valve seating body 110 arranged in the valve seating body receptacle 43 protrudes out of the housing 10. The portion exhibits an outer circumference 112, in particular an outer circumferential surface 112. The housing 20 (or another component part, such as for example a cover or a pump in general) is centered on the portion of the valve seating body 110 which protrudes out of the housing 10. The housing 20 exhibits an inner circumference 24, in particular an inner circumferential surface 24, which surrounds the outer circumference of the valve seating body 110 and is centered on it. In particular, the outer circumferential surface 112 and the inner circumferential surface 24 rest against each other. The portion of the valve seating body 110 which protrudes out of the housing 10 protrudes into the housing 20 which comprises a cavity comprising the inner circumferential surface 24 and the axial abutment 22 for this purpose. The axial abutment 22 is formed by an end-facing wall of the cavity. The outlet of the fluid channel 21 pointing towards the valve array 100 is surrounded, in particular annularly, by the end-facing wall.

Because the valve seating body 110 protrudes from the valve seating body receptacle 13 and/or the housing 10, it can additionally serve as a positioning or centering element for the housing 20, whereby the housing 20 can be centered or positioned on or by the valve seating body 110. The advantage of this is that an additional centering element, such as for example a centering sleeve, can thus be omitted.

The technical advantage of the embodiment shown in the FIGURE can be summarized as follows:
- arrangement of the valve seating body 110 in the valve seating body receptacle 13 which is secure solely for transport;
- abutment 22 for the valve seating body 110 in the housing 20 which is separate from the housing 10;
- the valve seating body 110 protrudes out of the valve seating body receptacle 13 in order to form a positioning or centering element for a separate component part, such as for example the housing 20.

A sealing element (not shown), such as for example a sealing disc or sealing ring, which surrounds the valve seating body 110 can be arranged between the housing 10 and the housing 20. The transition from the fluid channel 21 into the fluid channel 15 is thus sealed off with respect to the outside.

A sealing element (not shown), such as for example a sealing disc or sealing ring, which can be arranged between the housing 10 and a component part to which the housing 10 is fastened, such as for example a transmission housing (not shown), surrounds the outlet 11 and seals off the transition of the channel 12 into a channel, arranged in accordance with the outlet channel 12 or the outlet 11 and formed by way of example by the transmission housing, with respect to the outside.

A valve 200, in particular a reflux valve, is arranged in the outlet channel 12. The reflux valve 200 comprises a valve seating body 210 which forms a valve seating 211 for a closing body 220. The valve seating body 210 is annular and comprises a passage 213. A closing body holder 240 is arranged on the valve seating body 210 and joined to the valve seating body 210 such that it is axially fixed. The closing body holder 240 comprises a side element 241 which laterally encloses an accommodating space for the closing body 220. The closing body holder 240 also comprises a support portion 243 which simultaneously forms the end of the valve 200 pointing in the second direction. The closing body holder 240 comprises at least one opening 242 which connects the accommodating space of the closing body holder 240 in fluid communication with the portion of the outlet channel 12 which lies between the outlet 11 and the valve 200. The valve 200 comprises a spring element 230, in particular a spring which is embodied as a helical spring and acts as a compression spring. One end of the spring element 230 is supported on the closing body 220, and its other end is supported on the support portion 243 and presses the closing body 220 against the valve seating 211.

In the example shown, the closing body 220 is rotationally symmetrical and comprises a shaft which can be axially or translationally shifted (see the direction of the arrow) in a guide which is formed by the closing body holder 240. When the fluid pressure in the portion of the outlet channel situated between the valve 200 and the delivery chamber of the first pump is greater than in the portion of the outlet channel 12 which lies between the outlet 11 and the valve 200 and is in particular large enough that the force acting on the closing body 220 overcomes the biasing force of the spring element 230, the closing body 220 lifts off the valve seating 211, thus enabling fluid to be delivered from the delivery chamber of the first pump to the outlet 11 through the valve 200 and the outlet channel 12. If the pressure in the portion of the outlet channel 12 which lies between the delivery chamber and the closing body 220 drops, such that the force acting on the closing body 220 is less than the biasing force of the spring element 230, then the spring element 230 presses the closing body 220 against the valve seating 211, thus preventing fluid from flowing back in the second direction, i.e. towards the delivery chamber of the first pump.

The arrangement shown in the FIGURE enables fluid to be delivered either from the first pump to the outlet 11 or from the second pump to the outlet 11 or from both the first pump and the second pump (simultaneously) to the outlet 11.

LIST OF REFERENCE SIGNS 1 pump array
10 housing of the first pump
11 outlet
12 outlet channel
13 valve seating body receptacle
15 fluid channel
18 cavity
20 housing of the second pump
21 fluid channel
22 axial abutment
23 gap
24 inner circumference/inner circumferential surface
100 valve array
110 body/valve seating body
111 valve seating
112 outer circumference/outer circumferential surface
113 passage
114 end-facing surface
120 closing body
130 spring element
140 closing body holder
141 lateral enclosure
142 opening of the lateral enclosure
143 end-facing wall
144 opening of the end-facing wall
200 valve
210 valve seating body
211 valve seating
213 passage
220 closing body
230 spring
240 holder
241 side element
242 opening
243 support portion

The invention claimed is:

1. A device comprising a first pump and a second pump arranged on the first pump, and a valve array which is adapted to allow and block a fluid flow, wherein the valve array comprises:
a fluid channel formed by a pump housing of the first pump;
a valve seating; and
a closing body, which is arranged in the fluid channel of the first pump, wherein the valve array is configured to allow a fluid flow when the closing body is lifted off the valve seating, and to prevent a fluid flow when the closing body rests against the valve seating,
wherein the valve seating is formed by a valve seating body, which is arranged in or on the fluid channel of the first pump,
the device further comprising a component part, wherein the second pump comprises a fluid channel, which is connected in fluid communication with the fluid channel of the first pump, such that the second pump is able to deliver fluid through the valve array of the first pump, and wherein the valve seating body protrudes out of the pump housing of the first pump, and
wherein a portion of the valve seating body protrudes into the component part
and/or
the component part is centered on or by the valve seating body.

2. The device according to claim 1, wherein the component part is one of a cover of the first pump, a housing of the second pump, an intermediate housing, or an intermediate plate.

3. The device according to claim 2, wherein the component part comprises an inner circumferential wall which surrounds an outer circumference of the valve seating body and is in centered on it.

4. The device according to claim 1, wherein the valve seating body is held on an inner circumference of the fluid channel in at least one of a frictional fit, a form-fit, a bonding fit or a surmountable bonding fit.

5. The device according to claim 1, wherein the valve seating body is adapted to be moved relative to the fluid channel.

6. The device according to claim 1, wherein the valve seating body is adapted to be shifted from a first holding position, in which it is held on the inner circumference of the fluid channel in a surmountable frictional fit or in a surmountable form-fit, in the second direction to a second holding position in which a movement of the valve seat body in the second direction is blocked.

7. The device according to claim 6, wherein in the second holding position, the valve seating body is held on the inner circumference of the fluid channel in a frictional fit and/or held on the inner circumference of the fluid channel or on the component part, which is separate from the inner circumferential wall of the fluid channel and on which the valve seating body is supported in the second direction, in a form-fit.

8. The device according to claim 1, wherein the valve seating body rests against the component part or can assume a position in which the valve seating body rests against the component part.

9. The device according to claim 8, wherein the component part is one of a cover, the second pump or a second housing of the second pump.

10. The device according to claim 1, wherein the first pump is adapted to deliver fluid to an outlet via a delivery chamber and an outlet channel which connects the delivery chamber and the outlet, wherein the fluid channel and the outlet channel merge, such that fluid can be delivered from the delivery chamber to the outlet via the outlet channel and/or the fluid channel of the valve array.

11. The device according to claim 10, wherein a valve which is arranged between the delivery chamber and the outlet is adapted to allow a fluid flow from the delivery chamber to the outlet and to block it in the opposite direction, wherein the fluid channel and the outlet channel merge between the valve and the outlet.

12. The device according to claim 1, wherein an outlet of the first pump is connected in fluid communication with a fluid consumer, wherein the first pump is preferably arranged on a housing of the fluid consumer or is or can be fastened to a housing of the fluid consumer.

13. The device according to claim 1, wherein the closing body is a rotationally symmetrical or spherical closing body.

14. The device according to claim 1, wherein the valve seating body is an annular valve seating body.

* * * * *